US012712792B2

(12) United States Patent
Truax et al.

(10) Patent No.: US 12,712,792 B2
(45) Date of Patent: Aug. 18, 2026

(54) UNIQUE USER SESSION TRACKING IN ADAPTIVE BITRATE VIDEO DELIVERY

(71) Applicant: Amazon Technologies, Inc., Reno, NV (US)

(72) Inventors: Gregory K. Truax, Portland, OR (US); Gary T. Hertel, Beaverton, OR (US)

(73) Assignee: Amazon Technologies, Inc., Reno, NV (US)

( * ) Notice: Subject to any disclaimer, the term of this patent is extended or adjusted under 35 U.S.C. 154(b) by 509 days.

(21) Appl. No.: 17/469,602

(22) Filed: Sep. 8, 2021

(65) Prior Publication Data

US 2021/0409290 A1 Dec. 30, 2021

Related U.S. Application Data

(63) Continuation of application No. 16/920,277, filed on Jul. 2, 2020, now Pat. No. 11,196,646, which is a continuation of application No. 14/077,477, filed on Nov. 12, 2013, now Pat. No. 10,749,761.

(60) Provisional application No. 61/883,434, filed on Sep. 27, 2013.

(51) Int. Cl.
*H04L 41/50* (2022.01)

(52) U.S. Cl.
CPC .................................. *H04L 41/509* (2013.01)

(58) Field of Classification Search
CPC .......................... H04L 41/509; H04L 41/5067
See application file for complete search history.

(56) References Cited

U.S. PATENT DOCUMENTS

| | | | | |
|---|---|---|---|---|
| 6,738,822 | B2 | 5/2004 | Fukasawa | |
| 7,142,563 | B1 | 11/2006 | Lin | |
| 8,234,350 | B1 * | 7/2012 | Gu | H04N 21/2668 725/86 |
| 8,914,824 | B2 * | 12/2014 | Braun | H04N 21/84 725/32 |
| 9,066,138 | B1 * | 6/2015 | Kraiman | H04N 21/2668 |
| 9,082,092 | B1 * | 7/2015 | Henry | A63F 13/335 |
| 9,253,229 | B1 * | 2/2016 | Strothmann | H04N 21/23439 |
| 9,256,675 | B1 | 2/2016 | Wiegering | |
| 9,264,780 | B1 * | 2/2016 | Stoica | G06F 11/0751 |
| 9,407,726 | B1 * | 8/2016 | He | H04L 67/06 |
| 9,613,042 | B1 * | 4/2017 | Joseph | G06F 16/16 |

(Continued)

OTHER PUBLICATIONS

Non-Final Office Action issued in U.S. Appl. No. 14/077,477 dated May 19, 2016.

(Continued)

*Primary Examiner* — Hien L Duong
(74) *Attorney, Agent, or Firm* — Hogan Lovells Cadwalader US LLP

(57) ABSTRACT

An apparatus having a device of a user and a computer is disclosed. The computer may be configured to (i) transfer a manifest to the device in response to a viewing session being opened. The manifest generally has a plurality of modified links to a plurality of bitrates of a video content. Each one of the modified links may include an identifier that is unique to the viewing session. The computer may also be configured to (ii) receive a particular one of the modified links from the device, (iii) log a presence of the viewing session, and (iv) generate a request by removing the identifier from the particular modified link.

20 Claims, 6 Drawing Sheets

(56) References Cited

U.S. PATENT DOCUMENTS 10,298,653 B1 5/2019 Cheng
2005/0262251 A1* 11/2005 Klemets .............. H04L 65/1101 375/E7.017
2008/0101376 A1 5/2008 Do
2008/0228920 A1* 9/2008 Souders ................ H04L 67/568 709/226
2009/0083279 A1 3/2009 Hasek
2009/0235343 A1* 9/2009 Sheehan ............... G06F 21/629 709/201
2010/0146085 A1 6/2010 Van Wie
2010/0157870 A1 6/2010 Song
2011/0082924 A1 4/2011 Gopalakrishnan
2011/0179185 A1* 7/2011 Wang .................... H04L 65/762 709/231
2012/0042090 A1 2/2012 Chen
2012/0047542 A1* 2/2012 Lewis .............. H04N 21/44016 725/97
2012/0102317 A1 4/2012 Mathur et al.
2012/0254432 A1* 10/2012 Roseborough .......... H04L 47/70 709/226
2012/0265856 A1* 10/2012 Major .............. H04N 21/64753 709/219
2013/0007226 A1 1/2013 White
2013/0054958 A1* 2/2013 Braness ............. H04N 21/6581 709/219
2013/0055368 A1 2/2013 Bauckman et al.
2013/0091249 A1 4/2013 McHugh
2013/0097309 A1* 4/2013 Ma .......................... H04L 67/02 709/224
2013/0152070 A1* 6/2013 Bhullar ............... G06F 9/44521 717/173
2013/0159455 A1* 6/2013 Braskich ............... H04L 67/303 709/217
2013/0212706 A1 8/2013 Pampagnin
2013/0254341 A1* 9/2013 Ramakrishnan ...... H04L 65/765 709/219
2013/0275557 A1* 10/2013 Myers .............. H04N 21/85406 709/219
2013/0308699 A1* 11/2013 Musser, Jr. .... H04N 21/234354 375/240.03
2013/0318208 A1 11/2013 Seshadri
2014/0019633 A1* 1/2014 Zhang ..................... H04L 67/02 709/231
2014/0040496 A1* 2/2014 Moorthy ................. H04L 65/80 709/231
2014/0040498 A1* 2/2014 Oyman ............... H04L 65/1104 709/231
2014/0068690 A1* 3/2014 Luthra ............... H04N 21/4363 725/110
2014/0089387 A1* 3/2014 Chapman .............. H04L 67/142 709/203
2014/0149557 A1* 5/2014 Lohmar .................. H04L 65/60 709/219
2014/0208374 A1* 7/2014 Delaunay ......... H04N 21/23439 725/109
2014/0279852 A1* 9/2014 Chen ....................... G06F 16/43 707/696
2014/0280746 A1* 9/2014 Johns ...................... H04L 67/06 709/219
2014/0281007 A1 9/2014 Lemmons
2014/0355603 A1* 12/2014 Li ......................... H04L 12/184 370/390
2014/0379871 A1* 12/2014 Van Brandenburg ........................ H04L 65/613 709/219
2015/0030071 A1* 1/2015 Heng ............... H04N 21/23439 375/240.16
2015/0085875 A1* 3/2015 Phillips ................. H04L 65/764 370/465
2015/0120883 A1 4/2015 Gurtowski
2015/0156243 A1* 6/2015 Skog ..................... H04L 65/765 709/219
2015/0172340 A1* 6/2015 Lohmar ........... H04N 21/26208 709/219
2015/0172757 A1 6/2015 Kafle
2016/0323348 A1 11/2016 Bradbury
2016/0380789 A1 12/2016 Gunnalan
2016/0380967 A1 12/2016 Moore
2018/0070113 A1 3/2018 Phillips
2018/0070119 A1 3/2018 Phillips
2019/0313147 A1 10/2019 Cava
2020/0014738 A1 1/2020 Gurtowski
2020/0342137 A1 10/2020 Barday
2020/0382275 A1 12/2020 Mocioiu

OTHER PUBLICATIONS

Final Office Action issued in U.S. Appl. No. 14/077,477 dated Dec. 29, 2016.
Non-Final Office Action issued in U.S. Appl. No. 14/077,477 dated Oct. 19, 2017.
Non-Final Office Action issued in U.S. Appl. No. 14/077,477 dated Jun. 28, 2018.
Final Office Action issued in U.S. Appl. No. 14/077,477 dated Feb. 25, 2019.
Non-Final Office Action issued in U.S. Appl. No. 14/077,477 dated Sep. 27, 2019.
Notice of Allowance issued in U.S. Appl. No. 14/077,477 dated Apr. 15, 2020.
Non-Final Office Action issued in U.S. Appl. No. 16/920,277 dated May 13, 2021.
Notice of Allowance issued in U.S. Appl. No. 16/920,277 dated Aug. 11, 2021.

* cited by examiner

FIG. 5A

UNIQUE USER SESSION TRACKING IN ADAPTIVE BITRATE VIDEO DELIVERY

RELATED APPLICATIONS

This application is a continuation of U.S. Non-provisional application Ser. No. 16/920,277, filed Jul. 2, 2020, which is a continuation of U.S. Non-provisional application Ser. No. 14/077,477, filed Nov. 12, 2013, which issued as U.S. Pat. No. 10,749,761 and which claims benefit of priority to U.S. Provisional Application No. 61/883,434, filed Sep. 27, 2013, the disclosures of all of which are incorporated by reference herein in their entirety for all intents and purposes.

FIELD OF THE INVENTION

The present invention relates to video distribution generally and, more particularly, to a method and/or architecture for unique user session tracking in adaptive bitrate video delivery.

BACKGROUND OF THE INVENTION

Identification of unique users watching video over the Internet is difficult. Conventional methods to uniquely track viewing sessions include client-side cookies and tracking Internet Protocol source addresses of client devices. However, the client-side cookies are not always supported by the client devices and can be disabled by the users. Tracking the source addresses does not uniquely identify the users where the client devices operate behind a proxy server or network address translation server.

It would be desirable to implement a unique user session tracking in adaptive bitrate video delivery.

SUMMARY OF THE INVENTION

The present invention concerns an apparatus having a device of a user and a computer. The computer may be configured to (i) transfer a manifest to the device in response to a viewing session being opened. The manifest generally has a plurality of modified links to a plurality of bitrates of a video content. Each one of the modified links may include an identifier that is unique to the viewing session. The computer may also be configured to (ii) receive a particular one of the modified links from the device, (iii) log a presence of the viewing session, and (iv) generate a request by removing the identifier from the particular modified link.

The objects, features and advantages of the present invention include providing a unique user session tracking in adaptive bitrate video delivery that may (i) embed a unique identifier in multiple links within a manifest, (ii) remove the unique identifier from a client selected link, (iii) avoid dependencies on client-side cookies, (iv) work where the clients are behind a proxy server or network address translation server and/or (v) work with multi-bitrate video content.

BRIEF DESCRIPTION OF THE DRAWINGS

These and other objects, features and advantages of the present invention will be apparent from the following detailed description and the appended claims and drawings in which:

FIGS. 5A-5B are a diagram of an example viewing session.

DETAILED DESCRIPTION OF THE PREFERRED EMBODIMENTS

Adaptive bitrate video delivered via hypertext transfer protocol (e.g., HTTP) follows a multi-step technique. A variant manifest may be requested via a HTTP command by a client device.

The manifest generally contains universal resource locators (e.g., URLs) that point to all available bitrates for a given media asset. A client player may select an appropriate bitrate and request individual media segments or fragments of the media asset for playback via another HTTP command. When the client device receives each segment or fragment, the received content may be displayed to a user. The client device may periodically request the individual bitrate manifest to determine if updated segments are available to be downloaded.

Some embodiments of the present invention allow hosts in one or more networks to uniquely identify viewing sessions by clients to access media content. The networks are generally supported by one or more origin server computers and one or more edge proxy server computers. A unique identifier may be embedded in the URLs of each request for a particular video rendition. The unique identifiers may be generated randomly and/or read from a list of predetermined identifiers.

For each request of the variant manifest, the origin server computer or a corresponding edge server computers generally adds a unique identifier to each of the URLs in a list of available bitrates. Upon receiving a request with a bitrate URL containing a unique identifier, the edge server computers or the origin server computer logs the unique identifier in a database (a local database, an internal database or a remote database) and presents the original content for the requested URL.

In some embodiments, the origin computer or the edge computers may respond to the requested bitrate URL with a modified bitrate manifest. The modified bitrate manifest generally contains segment (or fragment) URLs that incorporate the unique identifier of the viewing session. Each subsequent request for a particular rendition playlist or media segment or fragment may contain the segment URLs as modified by the unique identifier for that viewing session. Upon receiving a request with a segment URL containing the unique identifier, the edge server computers or the origin server computer presents the original content segment for the requested segment URL.

Figure 1:
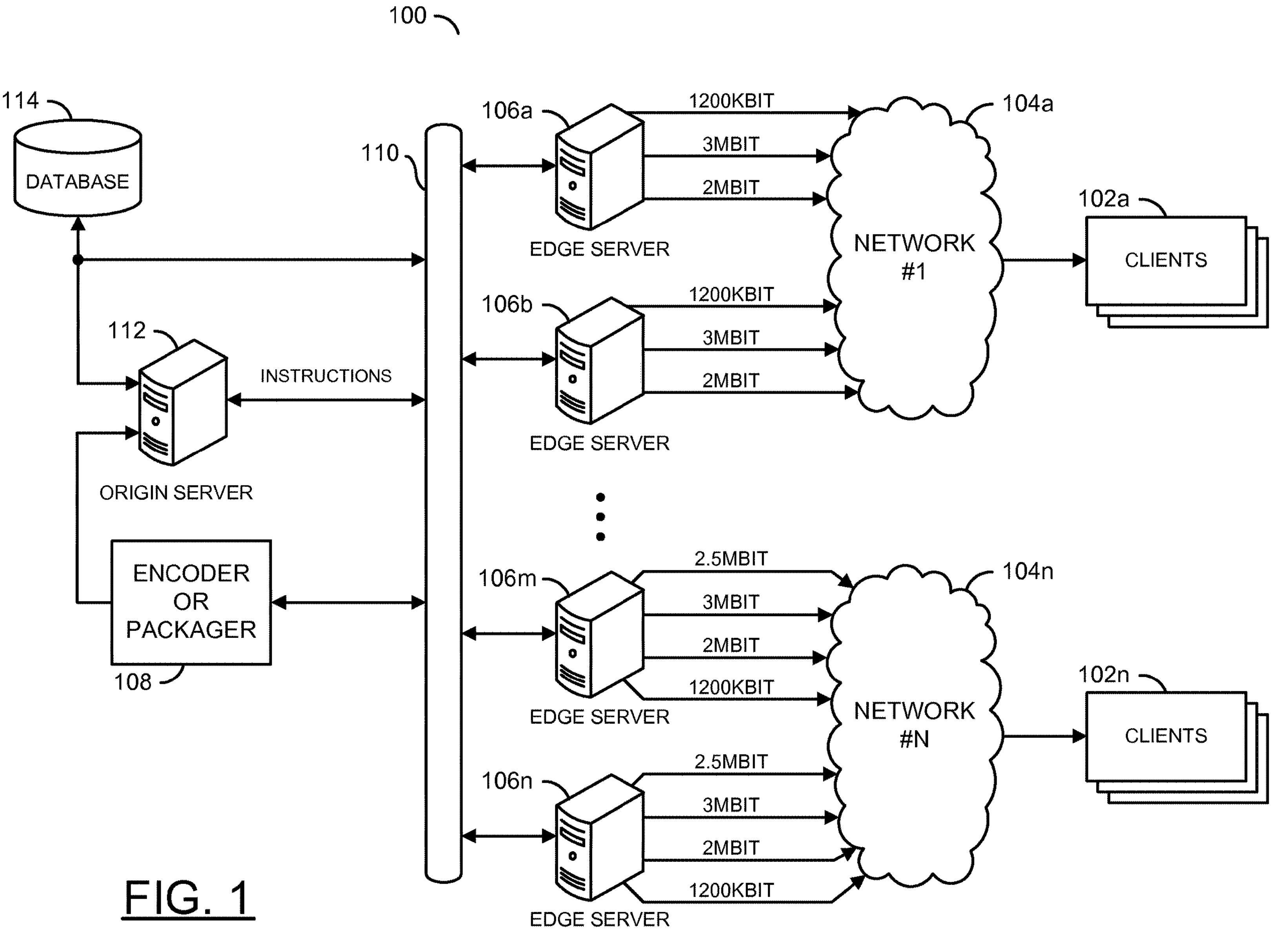
FIG. 1 is a diagram illustrating a video processing deployment system in accordance with a preferred embodiment of the present invention.

Referring to FIG. 1, a diagram illustrating a video processing deployment system 100 is shown in accordance with a preferred embodiment of the present invention. The system (or apparatus or architecture) 100 may comprise a number of client devices (or circuits) 102*a*-102*n*, one or more networks 104*a*-104*n*, a plurality of edge server computers (or slave server computers) 106*a*-106*n*, one or more video (or content) source devices (or circuits) 108, one or more video deployment networks 110, and an origin server computer (or master server computer) 112.

Player applications may reside on a number of the client devices 102*a*-102*n*. The devices 102*a*-102*n* may include computers, televisions, set-top boxes, cellular telephones, tablets, and other mobile devices. The devices 102*a*-102*n* may be configured to receive content (e.g., video, audio, audio-video, etc.) from the networks 104*a*-104*n* (e.g., the Internet). The devices 102*a*-102*n* may be connected to the networks 104*a*-104*n* using wired (e.g., cable), wireless (e.g., Wi-Fi, satellite, etc.), third generation (e.g., 3G) links, and/or fourth generation (e.g., 4G) links. Communication between the devices 102*a*-102*n* and the networks 104*a*-104*n* may be handled by protocols including, but not limited to, hypertext transfer protocol (e.g., HTTP). Streaming technologies such as Pantos from Apple, Inc., Smooth Streaming from Microsoft Corp., HTTP Dynamic Streaming from Adobe or MPEG Dynamic Adaptive Streaming over HTTP (e.g., MPEG DASH) may be used.

The networks 104*a*-104*n* generally make a plurality of streams available to the devices 102*a*-102*n*. The streams may originate from the computer 112 and/or from the encoder/packager device 108 via the computer 112. The streams are subsequently broadcast by the computers 106*a*-106*n*. Some of the streams may be recorded media assets. Other streams may be live events.

The computer 112 may be configured to store content, service the content to the server computers 106*a*-106*n* and optionally modify bitrate manifests with unique identifiers. The computer 112 may also communicate with a database 114. The database 114 may compile (or store) the information, metrics, alerts, errors and viewing session data generated by the computers 106*a*-106*n*.

Figure 2:
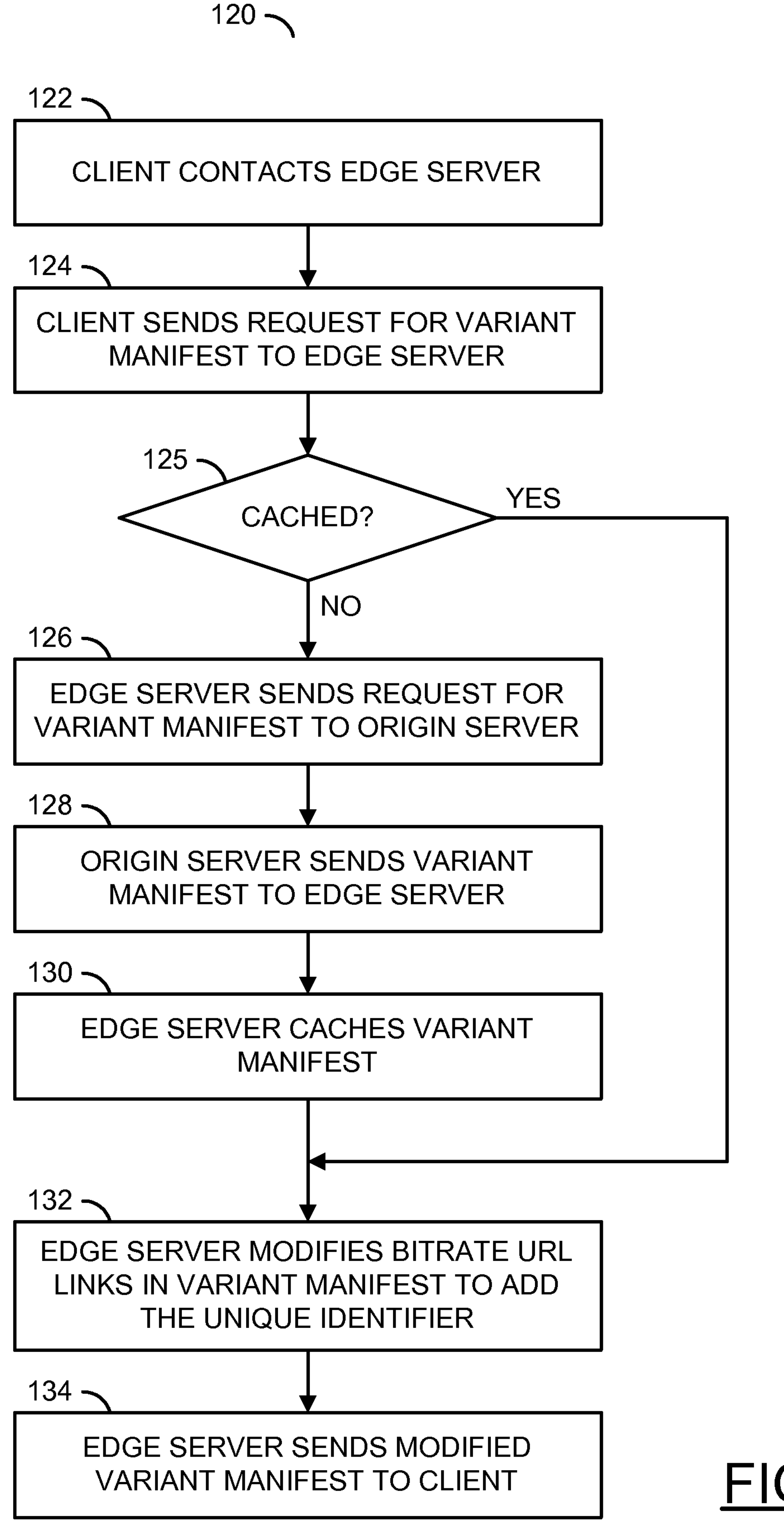
FIG. 2 is a flow diagram of an example method for initializing a viewing session.

Referring to FIG. 2, a flow diagram of an example method 120 for initializing a viewing session is shown. The method (or process) 120 generally comprises a step (or state) 122, a step (or state) 124, a step (or state) 125, a step (or state) 126, a step (or state) 128, a step (or state) 130, a step (or state) 132, and a step (or state) 134. The method 120 is generally implemented by the system 100.

In the step 122, a client device (e.g., 102*a*) may contact a corresponding edge computer (e.g., 106*a*). A purpose of the contact may be to begin a viewing session for video content. For example, the client may browse to a web page having video content available through the edge computer 106*a*. The device 102*a* may send a request in the step 124 to the computer 106*a* via the network 104*a* for a variant manifest (or playlist) of a video program. In the step 125, the computer 106*a* may determine if the request is already buffered in a cache. If the request is not cached, the computer 106*a* may send the request for the variant manifest to the computer 112 via the network 110 in the step 126. If the request is cached, the computer method 120 may continue with the step 132 to generate a modified variant manifest.

In the step 128, the computer 112 generally sends the requested variant manifest to the computer 106*a*. The computer 106*a* may cache the variant manifest in the step 130. In the step 132, the computer 106*a* modifies each bitrate URL link in the requested variant manifest. The modifications may be in the form of a unique identifier added into each bitrate URL in the requested variant manifest. The computer 106*a* may record that a new viewing session has started when the variant manifest request (or message) is sent to the computer 112 (e.g., step 126) and/or the unique identifier is generated (e.g., step 132). Once the bitrate URL links have been modified, the computer 106*a* generally sends the modified variant manifest back to the requesting device 102*a* in the step 134.

Figure 3:
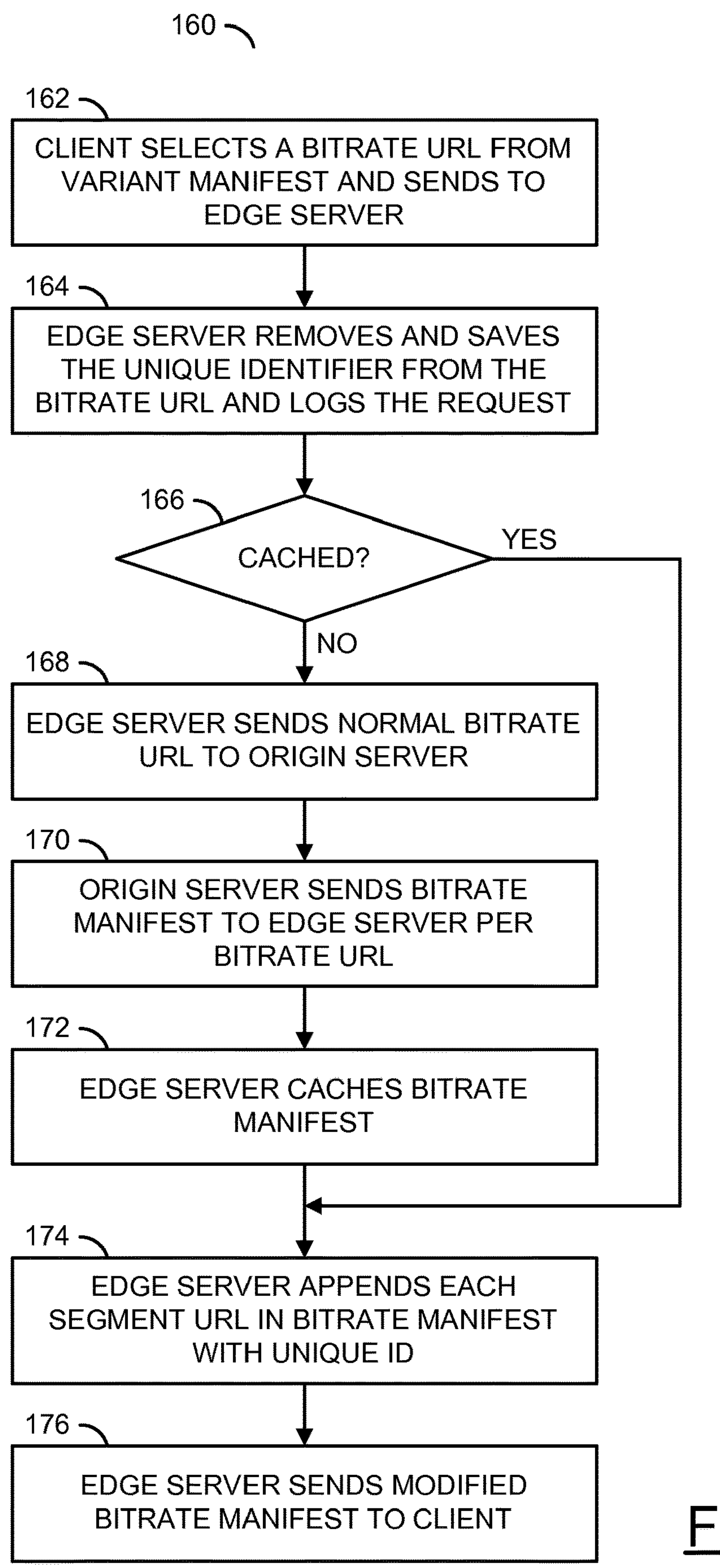
FIG. 3 is a flow diagram of an example method for setup of the viewing session.

Referring to FIG. 3, a flow diagram of an example method 160 for setup of the viewing session is shown. The method (or process) 160 generally comprises a step (or state) 162, a step (or state) 164, a step (or state) 166, a step (or state) 168, a step (or state) 170, a step (or state) 172, a step (or state) 174 and a step (or state) 176. The method 160 is generally implemented by the system 100.

In the step 162, the device 102*a* may select a particular modified bitrate URL from the modified variant manifest received from the computer 106*a*. The selected modified bitrate URL is returned to the computer 106*a*. The computer 106*a* may remove the unique identifier from the selected bitrate URL, save the unique identifier and log the request in the step 164.

The computer 106*a* generally checks a local cache in the step 166 to determine if a bitrate manifest associated with the requested bitrate URL (with or without the unique identifier) is readily available in the cache. If not, the computer 106*a* may send the selected normal (unmodified to remove the unique identifier) bitrate URL to the computer 112 in the step 168. The computer 112 generally responses in the step 170 by sending the requested bitrate manifest to the computer 106*a*. The computer 106*a* may cache the bitrate manifest received from the computer 112 in the step 172. Regardless if the computer 106*a* obtained the requested bitrate manifest from the local cache or from the computer 112, the computer 106*a* may modify each segment URL (or link) within the bitrate manifest in the step 174 to add the unique identifier saved in the step 164. In the step 176, the computer 106*a* may send the modified requested bitrate manifest to the requesting device 102*a*.

Each URL (bitrate URLs and segment URLs) generally includes a scheme name, a host name, a path to a resource, an optional query string, and an optional fragment identifier. The host name may be a domain name or an Internet Protocol (e.g., IP) address. The scheme generally explains how to connect, the host name specifies where to connect, and the remaining items generally specify where the desired resource is located. In some embodiments, the modification of each URL may be an addition of the unique identifier (e.g., a string of alphanumeric characters) to the path portion of the URL. Other positions within the URLs may be modified with the unique identifiers to meet the criteria of a particular application.

Figure 4:
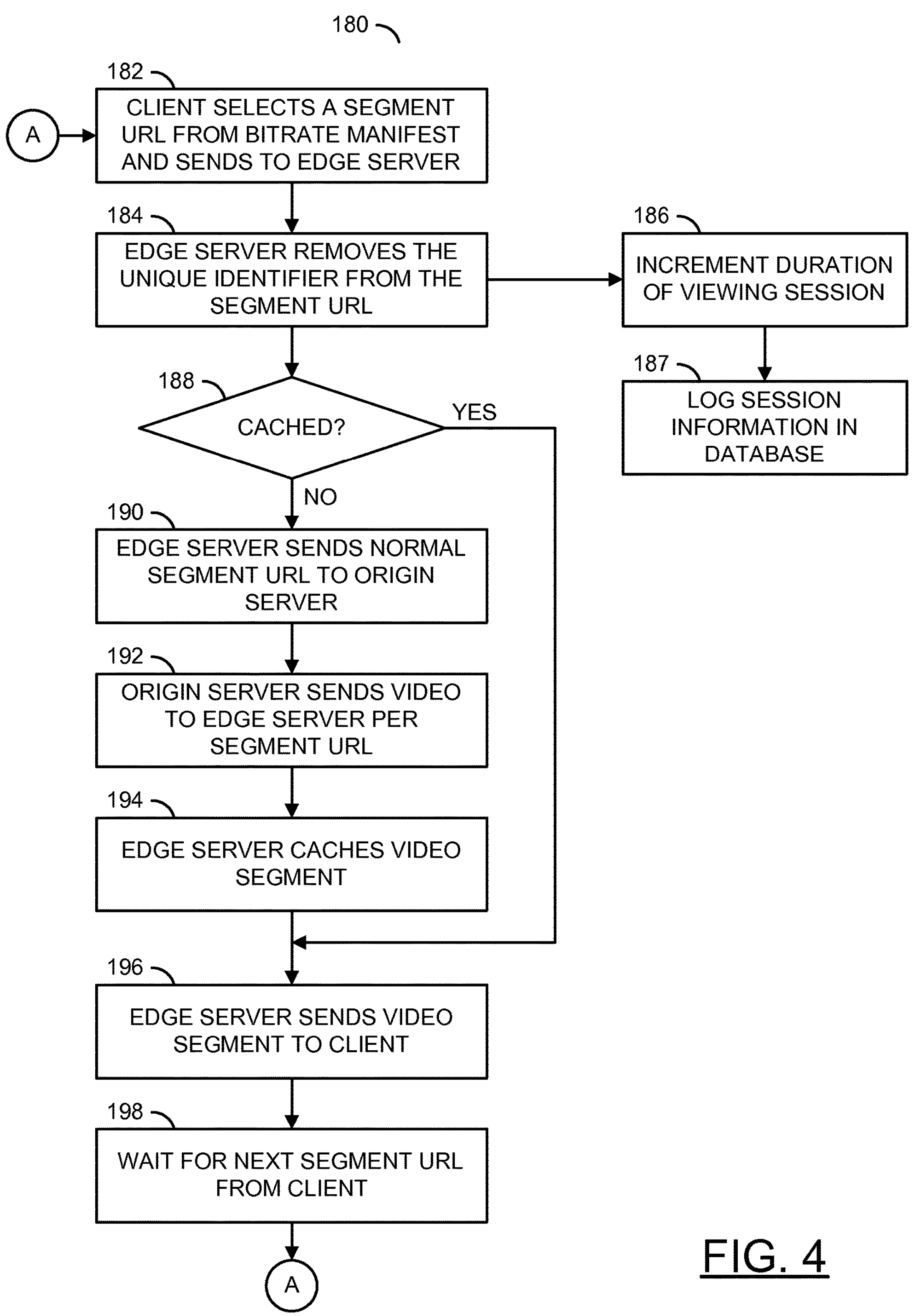
FIG. 4 is a flow diagram of an example method for servicing the viewing session.

Referring to FIG. 4, a flow diagram of an example method 180 for servicing the viewing session is shown. The method (or process) 180 generally comprises a step (or state) 182, a step (or state) 184, a step (or state) 186, a step (or state) 187, a step (or state) 188, a step (or state) 190, a step (or state) 192, a step (or state) 194, a step (or state) 196 and a step (or state) 198. The method 180 is generally implemented by the system 100.

In the step 182, the device 102*a* may select a particular modified segment URL from the modified bitrate manifest received from the computer 106*a*. The selected modified segment URL is subsequently returned to the computer 106*a*. The computer 106*a* may remove the unique identifier from the selected segment URL in the step 184. The computer 106*a* subsequently increments a count for a duration of the unique viewing session in the step 186. The information (including the duration count) may be logged in the database in the step 187. The database may be in any among the computers 106*a*-106*n*, the computer 112 and/or a stand-alone database (e.g., 114).

The computer 106*a* generally checks a local cache in the step 188 to determine if the video content requested by the segment URL (with or without the unique identifier) is readily available in the cache. If not, the computer 106*a* may send the selected normal (unmodified to remove the unique identifier) segment URL to the computer 112 in the step 190. The computer 112 generally responses in the step 192 by sending the requested video segment to the computer 106*a*. The computer 106*a* generally caches the requested video segment received from the computer 112 in the step 194. The computer 106*a* may subsequently send the requested video segment to the requesting device 102*a* in the step 196.

The computer 106*a* may wait in the step 198 for a next modified segment URL from the device 106*a*. Once the next modified segment URL has been received, the method 180 generally resumes with the step 182. The viewing session for the device 102*a* generally ends when the client 102*a* stops making requests (e.g., logs off, a timeout occurs and the like). The computer 106*a* may continue waiting for a next request from the client device 102*a* or any other client device 102*b*-102*n*.

Figure 5A:
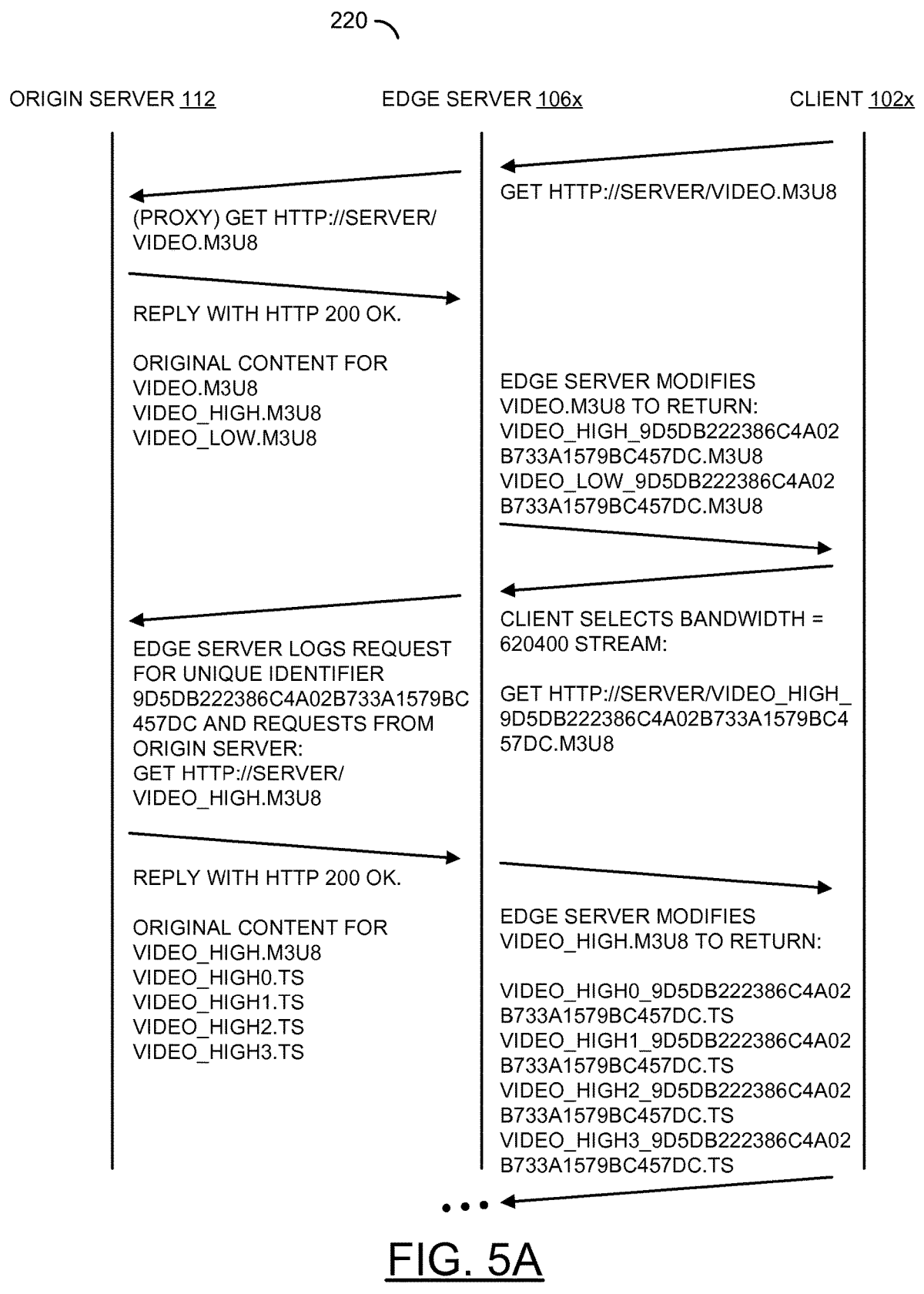
Figure 5B:
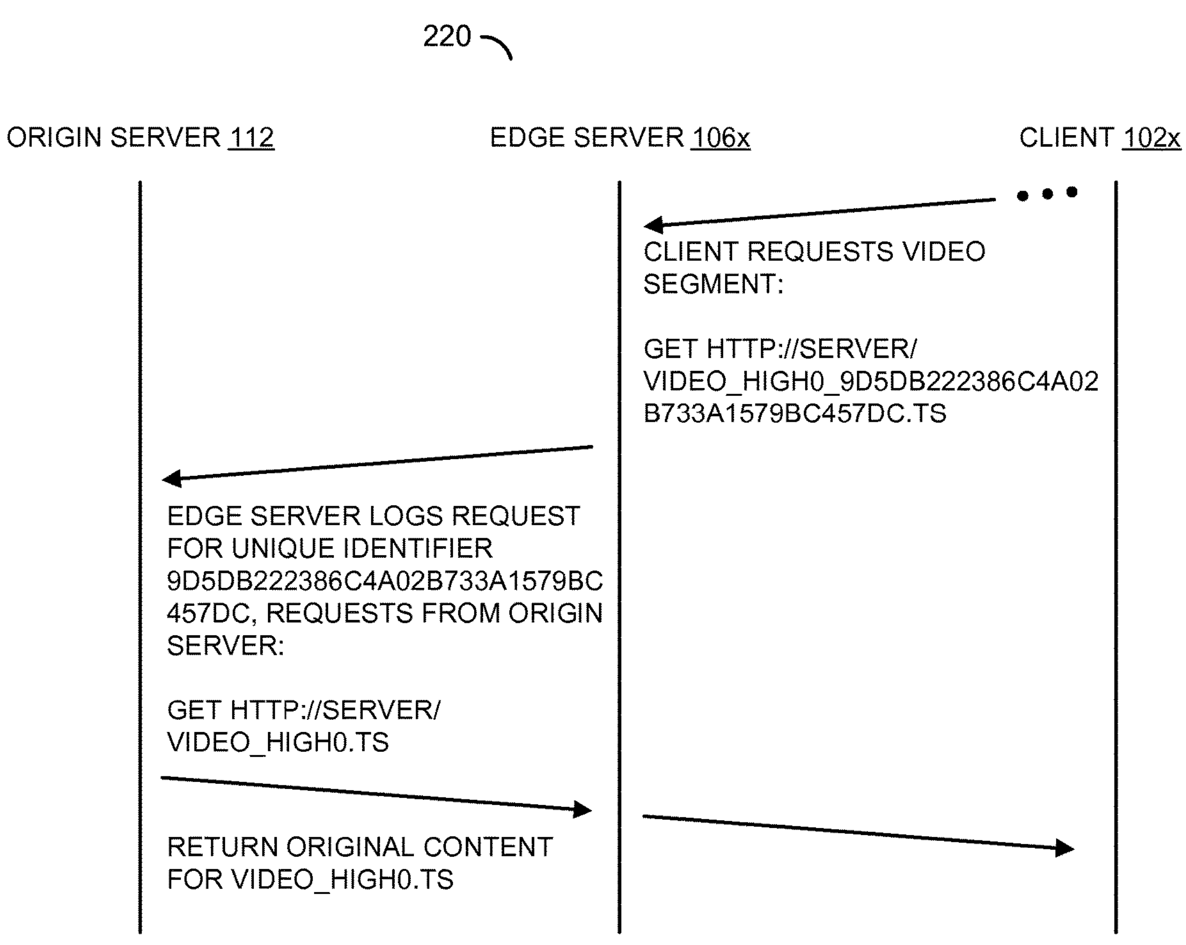

Referring to FIGS. 5A and 5B, a diagram of an example viewing session 220 is shown. The session 220 may be implemented by the computer 112, one of the computers 106*a*-106*n* (e.g., 106*x*) and one of the devices 102*a*-102*n* (e.g., 102*x*).

The session 220 generally begins when the device 102*x* issues a HTTP GET command (e.g., GET HTTP://SERVER/VIDEO.M3U8) to the computer 106*x*. The computer 106*x* may relay the HTTP GET command to the computer 112. The computer 112 may respond to the HTTP GET command with an acknowledge command (e.g., HTTP 200 OK).

The requested content in the example is a video program identified in a playlist (e.g., VIDEO.M3U8). The playlist generally contains bitrate links (e.g., URLs) to multiple (e.g., two) versions of the video program, each version having a different bitrate (e.g., a 620400 bandwidth and a 320400 bandwidth). A low bitrate version may be identified by a bitrate URL link VIDEO_LOW.M3U8. A high bitrate version of the video program is generally identified by a bitrate URL link VIDEO_HIGH.M3U8. The computer 112 generally returns the playlist to the requesting computer 106*a*.

The computer 106*x* (or in some cases the computer 112) may modify the bitrate URL links to the low bitrate version and the high bitrate version of the video program in the playlist by adding the unique identifier (e.g., 9D5DB222386C4A02B733A1579BC457DC). The computer 106*x* returns the now-modified variant playlist to the client device 102*x*. The modified variant playlist may contain a modified bitrate URL for each version of the video content (e.g., VIDEO_LOW_9D5DB222386C4A02B733A1579BC457DC.M3U8 and VIDEO_HIGH_9D5DB222386C4A02B733A1579BC457DC.M3U8)

Once the client device 102*x* has determined an appropriate bitrate from the variant playlist VIDEO.M3U8, the device 102*x* may transmit the selected (and modified) bitrate URL back to the computer 106*x*. The computer 106*x* generally logs the request to view the video program in the database. The computer 106*x* may also optionally log the requested bitrate in the database. The computer 106*x* may remove (or strip) the unique identifier from the modified bitrate URL to recreate the original bitrate URL link (e.g., VIDEO_HIGH.M3U8). If the requested bitrate manifest is not cached by the computer 106*x*, the computer 106*x* may send a request to the computer 112 (e.g., GET HTTP://SERVER/VIDEO_HIGH.M3U8).

The computer 112 responds to the request for the bitrate manifest by sending one or more segment URLs (e.g., VIDO_HIGHO.TS to VIDEO_HIGH3.TS) back to the requesting computer 106*x*. The computer 106*x* modifies the URLs in the bitrate manifest by incorporating the unique identifier. The modified bitrate manifest is subsequently transferred from the computer 106*x* to the client 102*x*.

The client 102*x* may select a modified segment URL, which is returned to the computer 106*x*. The computer 106*x* generally logs the request for the segment and checks the local cache for a copy of the requested segment at the requested bitrate. If a cache copy is found, the computer 106*x* generally sends the requested segment of the content to the client 102*x*. If no cache copy is found, the computer 106*x* strips the unique identifier from the requested segment URL and transfers the normal recreated segment URL back to the computer 112.

The computer 112 generally responds to the recreated segment URL by starting a transmission of the requested original video segment to the computer 106*x*. The video stream may then be transmitted to the requesting client device 102*x*, where the video is displayed.

While the current viewing session is open, the client device 102*x* may re-request the same video content at the same video rate by reseeding one or more modified segment URLs. Since the computer 106*x* has already logged the unique identifier for the current viewing session, the computer 106*x* may not add the repeat request for the same content to the database, thus maintaining a log of each unique viewing session. If the client device 102*x* requests the same video content at a different video rate, the computer 106*x* may comply with the request but not log the request as a new entry in the database. The bitrate URL request for the different bitrate still has the same unique identifier as the earlier bitrate URL request. Thus, the computer 106*x* may count unique viewing sessions. If the client device 102*x* requests a different video content, the computer 106*x* may increment the count in the database to record the viewing session of the different content. If the client device 102*x* ends the current viewing session and subsequently opens a new viewing session, the computer 106*x* may increment the unique viewing session count to record the new viewing session, though the same content at the same bitrate may be requested in both viewing sessions. In some embodiments, for example a lightly-loaded system—such as a corporate video content delivery network, the computer 112 may perform the tracking functions in place of the computers 106*a*-106*n*.

The functions and structures illustrated in the diagrams of FIGS. 1-5B may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors.

While the invention has been particularly shown and described with reference to the preferred embodiments thereof, it will be understood by those skilled in the art that various changes in form and details may be made without departing from the scope of the invention.

The invention claimed is:

1. A system comprising:

at least one processor; and memory including instructions for executing on the at least one processor to cause the system to:

enable a viewing session for media content, the viewing session associated with an initial manifest comprising stored identifiers for a plurality of bitrates of the media content;

determine an appropriate bitrate from a selection provided by a device that received the initial manifest;

modify, based at least on the selection, the initial manifest to generate a modified manifest that has a plurality of modified links of different bitrates from a modification to the stored identifiers, individual links of the modified links including a session identifier that is unique to the viewing session and to the appropriate bitrate of the different bitrates;

upon determining that the media content at the appropriate bitrate is not cached, cache the media content at the appropriate bitrate; and upon determining that the media content at the appropriate bitrate is cached:

remove the session identifier from the individual links associated with the media content;

log a presence of the viewing session; and provide the media content.

2. The system according to claim 1, wherein the memory including instructions for executing on the at least one processor further causes the system to:

receive periodic requests for the initial manifest; and generating new modified manifests referencing updated segments of the media content, the new modified manifests to be provided to the device.

3. The system according to claim 1, wherein the memory including instructions for executing on the at least one processor further causes the system to:

determine the appropriate bitrate as associated with the device that is one of a computer, a television, a set-top box, a cellular telephone, a tablet, and a mobile device.

4. The system according to claim 1, wherein the memory including instructions for executing on the at least one processor further causes the system to:

enable the device to provide the selection as a selection for a variant manifest than the initial manifest, wherein the variant manifest comprises the appropriate bitrate for the media content.

5. The system according to claim 1, wherein the memory including instructions for executing on the at least one processor further causes the system to:

enable the modified manifest or a variant of the modified manifest to comprise the modified links from the modification to an appropriate one of the stored identifiers associated with the appropriate bitrate.

6. The system according to claim 1, wherein the memory including instructions for executing on the at least one processor further causes the system to:

provide the media content at the appropriate bitrate in response to a further selection from the device.

7. The system according to claim 1, wherein the memory including instructions for executing on the at least one processor further causes the system to:

enable an application of the device to select the appropriate bitrate; and provide individual segments or fragments of the media content for playback in the device based in part on the appropriate bitrate.

8. A method for tracking a viewing session for media content, comprising:

enabling the viewing session that is associated with an initial manifest comprising stored identifiers for a plurality of bitrates of a media content;

determining an appropriate bitrate, from a selection provided by a device that received the initial manifest;

modifying, based at least on the selection, the initial manifest to generate a modified manifest that has a plurality of modified links of different bitrates from a modification to the stored identifiers, individual links of the modified links including a session identifier that is unique to the viewing session and to the appropriate bitrate of the different bitrates;

upon determining that the media content at the appropriate bitrate is not cached, caching the media content at the appropriate bitrate; and upon determining that the media content at the appropriate bitrate is cached:

removing the session identifier from the individual links associated with the media content;

logging a presence of the viewing session; and providing the media content.

9. The method according to claim 8, further comprising:

receiving periodic requests for the initial manifest; and generating new modified manifests referencing updated segments of the media content, the new modified manifests to be provided to the device.

10. The method according to claim 8, further comprising:

determining the appropriate bitrate as associated with the device that is one of a computer, a television, a set-top box, a cellular telephone, a tablet, and a mobile device.

11. The method according to claim 8, further comprising:

enabling the device to provide the selection as a selection for a variant manifest than the initial manifest, wherein the variant manifest comprises the appropriate bitrate for the media content.

12. The method according to claim 8, further comprising:

enabling the modified manifest or a variant of the modified manifest to comprise the modified links from the modification to an appropriate one of the stored identifiers associated with the appropriate bitrate.

13. The method according to claim 8, further comprising:

providing the media content at the appropriate bitrate in response to a further selection from the device.

14. The method according to claim 8, further comprising:

enabling an application of the device to select the appropriate bitrate; and providing individual segments or fragments of the media content for playback in the device based in part on the appropriate bitrate.

15. A non-transitory computer readable storage medium including instructions stored thereon which, when executed by at least one processor, cause the at least one processor to:

enable a viewing session that is associated with an initial manifest comprising stored identifiers for a plurality of bitrates of a media content;

determine an appropriate bitrate, from a selection provided by a device that received the initial manifest;

modify, based at least on the selection, the initial manifest to generate a modified manifest that has a plurality of modified links of different bitrates from a modification to the stored identifiers, individual links of the modified links including a session identifier that is unique to the viewing session and to the appropriate bitrate of the different bitrates;

upon determining that the media content at the appropriate bitrate is not cached, cache the media content at the appropriate bitrate; and upon determining that the media content at the appropriate bitrate is cached:

remove the session identifier from the individual links associated with the media content;

log a presence of the viewing session; and provide the media content.

16. The non-transitory computer readable storage medium of claim 15, including the instructions stored thereon which, when executed by the at least one processor, further cause the at least one processor to:

receive periodic requests for the initial manifest; and generate new modified manifests referencing updated segments of the media content, the new modified manifests to be provided to the device.

17. The non-transitory computer readable storage medium of claim 15, including the instructions stored thereon which, when executed by the at least one processor, further cause the at least one processor to:

determine the appropriate bitrate as associated with the device that is one of a computer, a television, a set-top box, a cellular telephone, a tablet, and a mobile device.

18. The non-transitory computer readable storage medium of claim 15, including the instructions stored thereon which, when executed by the at least one processor, further cause the at least one processor to:

enable the device to provide the selection as a selection for a variant manifest than the initial manifest, wherein the variant manifest comprises the appropriate bitrate for the media content.

19. The non-transitory computer readable storage medium of claim 15, including the instructions stored thereon which, when executed by the at least one processor, further cause the at least one processor to:

enable the modified manifest or a variant of the modified manifest to comprise the modified links from the modification to an appropriate one of the stored identifiers associated with the appropriate bitrate.

20. The non-transitory computer readable storage medium of claim 15, including the instructions stored thereon which, when executed by the at least one processor, further cause the at least one processor to:

provide the media content at the appropriate bitrate in response to a further selection from the device.

* * * * *